United States Patent
Ido et al.

(10) Patent No.: US 8,829,718 B2
(45) Date of Patent: Sep. 9, 2014

(54) DC-DC CONVERTER

(75) Inventors: Yusaku Ido, Kani (JP); Yasumichi Omoto, Kasugai (JP); Koji Hachiya, Kasugai (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 677 days.

(21) Appl. No.: 13/187,625

(22) Filed: Jul. 21, 2011

(65) Prior Publication Data

US 2012/0032517 A1 Feb. 9, 2012

(30) Foreign Application Priority Data

Aug. 9, 2010 (JP) ................ P2010-178358

(51) Int. Cl.
 *H02J 1/00* (2006.01)
 *H02J 3/00* (2006.01)
 *H02M 3/337* (2006.01)
 *H02M 1/00* (2006.01)

(52) U.S. Cl.
 CPC .... *H02M 3/3376* (2013.01); *H02M 2001/0025* (2013.01)
 USPC ............. 307/77; 307/9.1; 307/10.1; 363/17

(58) Field of Classification Search
 CPC ................ H02M 3/3376; H02M 2001/0025
 USPC ........................................................ 307/77
 See application file for complete search history.

(56) References Cited

U.S. PATENT DOCUMENTS

| | | | |
|---|---|---|---|
| 2008/0316774 A1* | 12/2008 | Ito et al. ................ | 363/17 |
| 2010/0142228 A1* | 6/2010 | Yamauchi et al. ........ | 363/17 |
| 2010/0148734 A1 | 6/2010 | Zhiang | |

FOREIGN PATENT DOCUMENTS

| | | |
|---|---|---|
| JP | 2003-274641 A | 9/2003 |
| JP | 2004166370 A | 6/2004 |
| JP | 2006-180603 A | 7/2006 |
| JP | 2006-288047 A | 10/2006 |
| JP | 2007-192723 A | 8/2007 |

OTHER PUBLICATIONS

Patent Abstract for Japanese Publication No. 2003-274641 Published Sep. 26, 2003 (1 page).
Patent Abstract for Japanese Publication No. 2006-180603 Published Jul. 6, 2006 (1 page).
Office Action in corresponding Chinese Application No. 201110225700.7, mailed Oct. 21, 2013 (11 pages).

\* cited by examiner

*Primary Examiner* — Rexford Barnie
*Assistant Examiner* — Toan Vu
(74) *Attorney, Agent, or Firm* — Osha Liang LLP

(57) ABSTRACT

A voltage drop of an output voltage of a DC-DC converter, caused by a wiring resistance, can properly be compensated at low cost. The DC-DC converter is connected to a low-voltage battery through an ignition switch and started up by the ignition switch. A transformation unit transforms a voltage inputted from a high-voltage battery and supplies the voltage to the low-voltage battery. A control circuit calculates a wiring resistance between the transformation unit and the low-voltage battery based on the voltage inputted from the low-voltage battery through the ignition switch in connecting the ignition switch and an output voltage and an output current of the transformation unit. The control circuit corrects a command value of the output voltage of the transformation unit based on the calculated wiring resistance to control the output voltage of the transformation unit. The invention can be applied to a DC-DC converter for electric-powered vehicle.

5 Claims, 11 Drawing Sheets

DC-DC CONVERTER

CROSS-REFERENCE TO RELATED APPLICATIONS

The present application claims priority from Japanese Patent Application No. 2010-178358, filed Aug. 9, 2010. The contents of both priority applications are hereby incorporated by reference in their entirety.

BACKGROUND OF THE INVENTION

1. Technical Field

One or more embodiments of the present invention relate to a DC-DC converter. Particularly, one or more embodiments of the present invention relate to a DC-DC converter that can compensate a voltage drop caused by a wiring resistance.

2. Related Art

Two types of batteries, namely, a high-voltage battery and a low-voltage battery are usually provided in an electric-powered vehicle such as an EV (Electric Vehicle), an HEV (Hybrid Electric Vehicle), or a PHEV (Plug-in Hybrid Electric Vehicle).

The high-voltage battery is mainly used as a power supply for a load of a high voltage (hereinafter, referred to as a high-voltage load), such as a main power motor for driving wheels of the electric-powered vehicle to travel and a compressor motor of an air conditioner. On the other hand, the low-voltage battery is mainly used as a power supply for a load of a low voltage (hereinafter, referred to as a low-voltage load), such as a motor for various ECUs (Electronic Control Units), EPSs (Electric Power Steerings), electric brakes, car audio devices, windshield wipers, and power windows, or an illumination lamp.

The low-voltage battery is usually charged so that a DC-DC converter transforms a voltage at the high-voltage battery to supply the transformed voltage to the low-voltage battery. When a large voltage drop is generated by a wiring resistance between the DC-DC converter and the low-voltage battery, in order to stably charge the low-voltage battery, it is necessary to control an output voltage of the DC-DC converter to compensate the voltage drop.

Therefore, conventionally, the DC-DC converter and an input terminal of an electronic device that is a load thereof are connected by a cable dedicated to detecting the voltage, the voltage inputted to the electronic device is directly measured, and control is performed such that the measured input voltage becomes a desired value, thereby compensating the voltage drop caused by the wiring resistance (for example, see Japanese Unexamined Patent Publication No. 2003-274641).

In the DC-DC converter disclosed in Japanese Unexamined Patent Publication No. 2003-274641, the output voltage of the DC-DC converter is controlled such that an output current and the voltage drop caused by the wiring resistance are compensated according to the output current of the DC-DC converter. Similarly to the DC-DC converter disclosed in Japanese Unexamined Patent Publication No. 2003-274641, Japanese Unexamined Patent Publication No. 2006-180603 proposes that, in addition to controlling the output voltage to compensate the voltage drop according to the output current, a voltage correction coefficient can be adjusted with respect to the output current using a variable resistance such that the wiring resistance can cope with a plurality of devices.

However, when the output voltage is controlled by directly measuring the input voltage of the load of the DC-DC converter, it is necessary to provide the additional wiring connecting the DC-DC converter and the load, and necessary cost increases.

Moreover, in the DC-DC converter disclosed in Japanese Unexamined Patent Publication No. 2006-180603, it is necessary that the wiring resistance of the device to which the DC-DC converter is applied be previously measured to adjust a variable resistance value in each device.

SUMMARY OF INVENTION

One or more embodiments of the present invention may properly compensate a voltage drop caused by a wiring resistance in an output voltage of a DC-DC converter.

In accordance with one or more embodiments of the present invention, there is provided a DC-DC converter that is connected to a battery through a starting switch and started up by the starting switch, the DC-DC converter including: a transformation unit that transforms an input voltage and supplies the voltage to the battery without the starting switch; a wiring resistance calculating unit that calculates a wiring resistance between the transformation unit and the battery based on a voltage inputted from the battery through the starting switch in connecting the starting switch and an output current of the transformation unit; and an output voltage control unit that controls the output voltage of the transformation unit by correcting a command value of the output voltage of the transformation unit based on the calculated wiring resistance.

In the DC-DC converter of one or more embodiments of the present invention, the wiring resistance between the transformation unit and the battery based on the voltage inputted from the battery through the starting switch in connecting the starting switch and the output voltage and output current of the transformation unit, and the command value of the output voltage of the transformation unit is corrected based on the calculated wiring resistance, thereby controlling the output voltage of the transformation unit.

Accordingly, the voltage drop of the output voltage of the DC-DC converter, caused by the wiring resistance, can properly be compensated at low cost.

For example, the starting switch includes an ignition switch or a control relay of an electric-powered vehicle. For example, the battery includes a battery for load of a low-voltage system of the electric-powered vehicle. For example, the transformation unit includes a half-bridge or full-bridge power converting circuit in which a switching element is used. For example, the wiring resistance calculating unit and the output voltage control unit include a microcomputer and a processor.

In one or more embodiments of the present invention the wiring resistance calculating unit records the calculated wiring resistance, the wiring resistance calculating unit does not calculate the wiring resistance when the wiring resistance is already recorded in connecting the starting switch, and the output voltage control unit corrects a command value of the output voltage of the transformation unit based on the recorded wiring resistance.

Therefore, the number of calculation times of the wiring resistance can be decreased.

In one or more embodiments of the present invention the wiring resistance calculating unit recalculates the wiring resistance based on a voltage inputted from the battery through the starting switch and the output voltage and output current of the transformation unit, when the voltage inputted from the battery through the starting switch is out of a predetermined target range.

Therefore, the wiring resistance can always be maintained at a proper value to more properly compensate the voltage drop of the output voltage of the DC-DC converter, caused by the wiring resistance.

In one or more embodiments of the present invention the wiring resistance calculating unit does not calculate the wiring resistance but sets the wiring resistance to a predetermined value when a load of the battery is not lower than a predetermined threshold in connecting the starting switch.

Therefore, the improper compensation of the voltage drop of the output voltage of the DC-DC converter, caused by the increase in error of the determined wiring resistance, is prevented.

According to one or more embodiments of the present invention, the voltage drop caused by the wiring resistance can be compensated in the output voltage of the DC-DC converter.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention. The description will be made in the following order.

1. First embodiment
2. Second embodiment
3. Modifications

<1. First Embodiment>

A first embodiment of the present invention will be described with reference to FIGS. 1 to 5.

[Configuration Example of In-Vehicle System 1]

Figure 1:
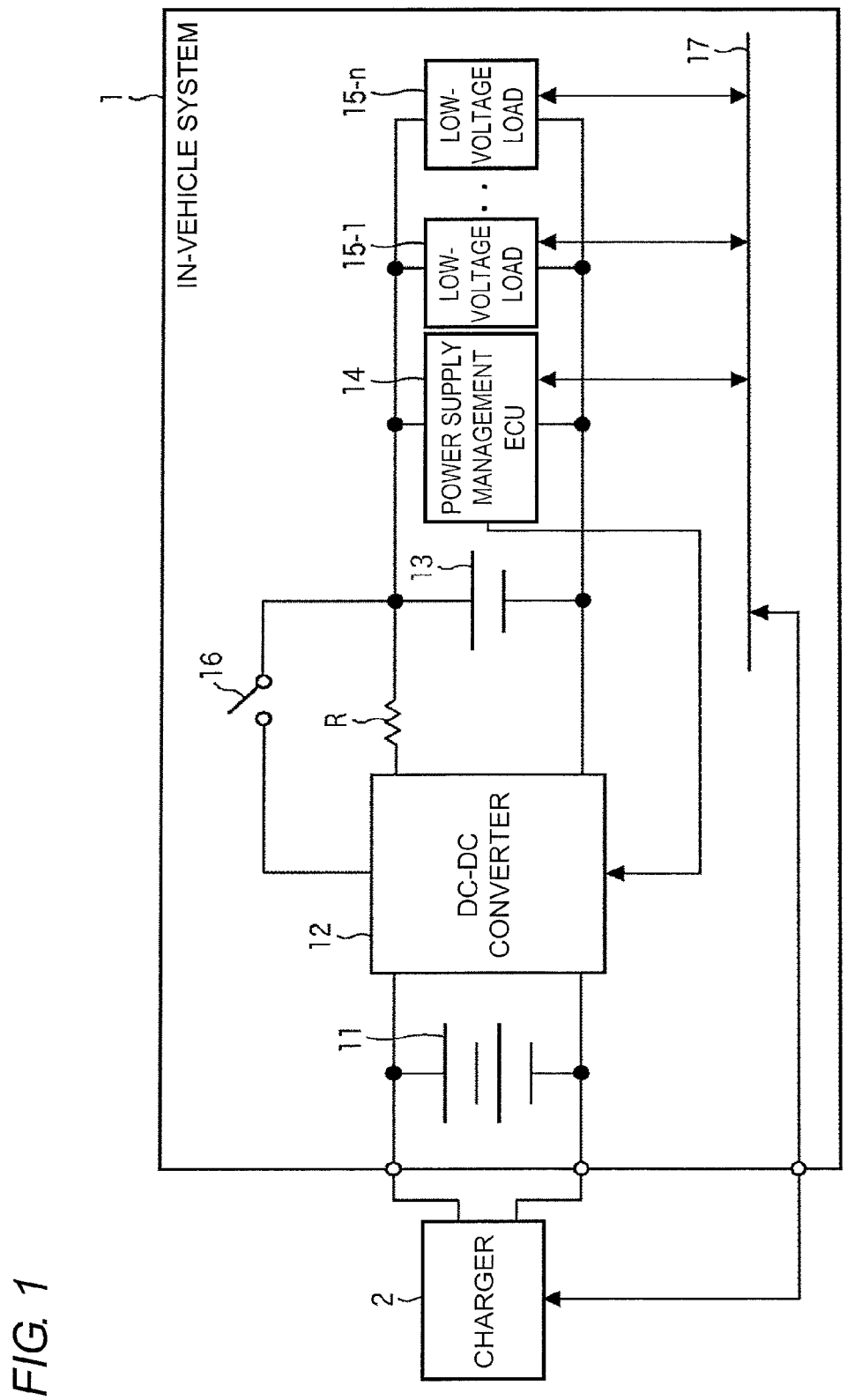
FIG. 1 is a block diagram illustrating an in-vehicle system according to a first embodiment of the present invention.

FIG. 1 is a block diagram illustrating an in-vehicle system according to a first embodiment of the present invention. An in-vehicle system 1 is provided in an electric-powered vehicle such as an EV, an HEV, or a PHEV. The in-vehicle system 1 includes a high-voltage battery 11, a DC-DC converter 12, a low-voltage battery 13, a power-supply management ECU 14, low-voltage loads 15-1 to 15-$n$, and an ignition switch 16. The power-supply management ECU 14 and the low-voltage loads 15-1 to 15-$n$ are connected to each other through an in-vehicle LAN (Local Area Network) 17, and the power-supply management ECU 14 and the low-voltage loads 15-1 to 15-$n$ transmit and receive various pieces of data by CAN (Controller Area Network) communication.

The high-voltage battery 11 supplies a DC power having a predetermined voltage to the DC-DC converter 12 and a high-voltage load (not illustrated). The high-voltage battery 11 is charged by a charger 2 connected to the outside of the in-vehicle system 1.

The DC-DC converter 12 transforms the voltage of the DC power supplied from the high-voltage battery 11 and supplies the DC power whose voltage is transformed to the low-voltage battery 13 to charge the low-voltage battery 13. The DC-DC converter 12 also supplies the DC power whose voltage is transformed to the power-supply management ECU 14 and the low-voltage loads 15-1 to 15-$n$.

The low-voltage battery 13 supplies the DC power having the predetermined voltage to the power-supply management ECU 14 and the low-voltage loads 15-1 to 15-$n$. That is, the power-supply management ECU 14 and the low-voltage loads 15-1 to 15-$n$ are driven by the power from the DC-DC converter 12 and the power from the low-voltage battery 13.

The low-voltage battery 13 supplies the DC power having the predetermined voltage to the DC-DC converter 12 through the ignition switch 16, and the DC-DC converter 12 is driven by the power from the low-voltage battery 13. Accordingly, the DC-DC converter 12 is started up when the ignition switch 16 is connected, and the DC-DC converter 12 is stopped when the ignition switch 16 is disconnected.

Hereinafter, a wiring resistance between an output unit of the DC-DC converter 12 and the low-voltage battery 13 is referred to as a wiring resistance R, and a resistance value of the wiring resistance R is denoted by a reference numeral R.

The power-supply management ECU 14 controls a power supply of the electric-powered vehicle. For example, the power-supply management ECU 14 controls charges and discharges of the high-voltage battery 11 and the low-voltage battery 13 and monitors states of the high-voltage battery 11 and the low-voltage battery 13. The power-supply management ECU 14 is connected to the charger 2 through the in-vehicle LAN 17 to transmit and receive various pieces of data to and from the charger 2.

The power-supply management ECU 14 supplies to the DC-DC converter 12 a signal indicating whether the high-voltage battery 11 is being charged. In addition, the power-supply management ECU 14 supplies to the DC-DC converter 12 a signal indicating whether a load amount of the low-voltage load 15 is equal to or lower than a predetermined threshold, that is, whether the low-voltage load 15 has the low load amount.

For example, the low-voltage loads 15-1 to 15-$n$ includes ECUs that control the EPS (Electric Power Steering), the electric brake, the car audio device, the windshield wiper, and at least a part of the electric-powered vehicle.

Hereinafter, the low-voltage loads 15-1 to 15-$n$ are simply referred to as the low-voltage load 15 when the low-voltage loads need not be distinguished from one another.

The ignition switch 16 acts as a start-up switch of an electric system of the electric-powered vehicle in addition to the start-up switch of the engine or the motor of the electric-powered vehicle in which the in-vehicle system 1 is provided. That is, the electric system of the electric-powered vehicle is activated when the ignition switch 16 is connected (turned on), and the electric system of the electric-powered vehicle is stopped when the ignition switch 16 is disconnected (turned off). The ignition switch 16 is connected between the DC-DC converter 12 and the low-voltage battery 13. When the ignition switch 16 is connected, the low-voltage battery 13 supplies the driving power to the DC-DC converter 12 through the ignition switch 16. A control relay is provided instead of the ignition switch 16, when the EV is the electric-powered vehicle in which the in-vehicle system 1 is provided.

[Configuration Example of DC-DC Converter 12]

Figure 2:
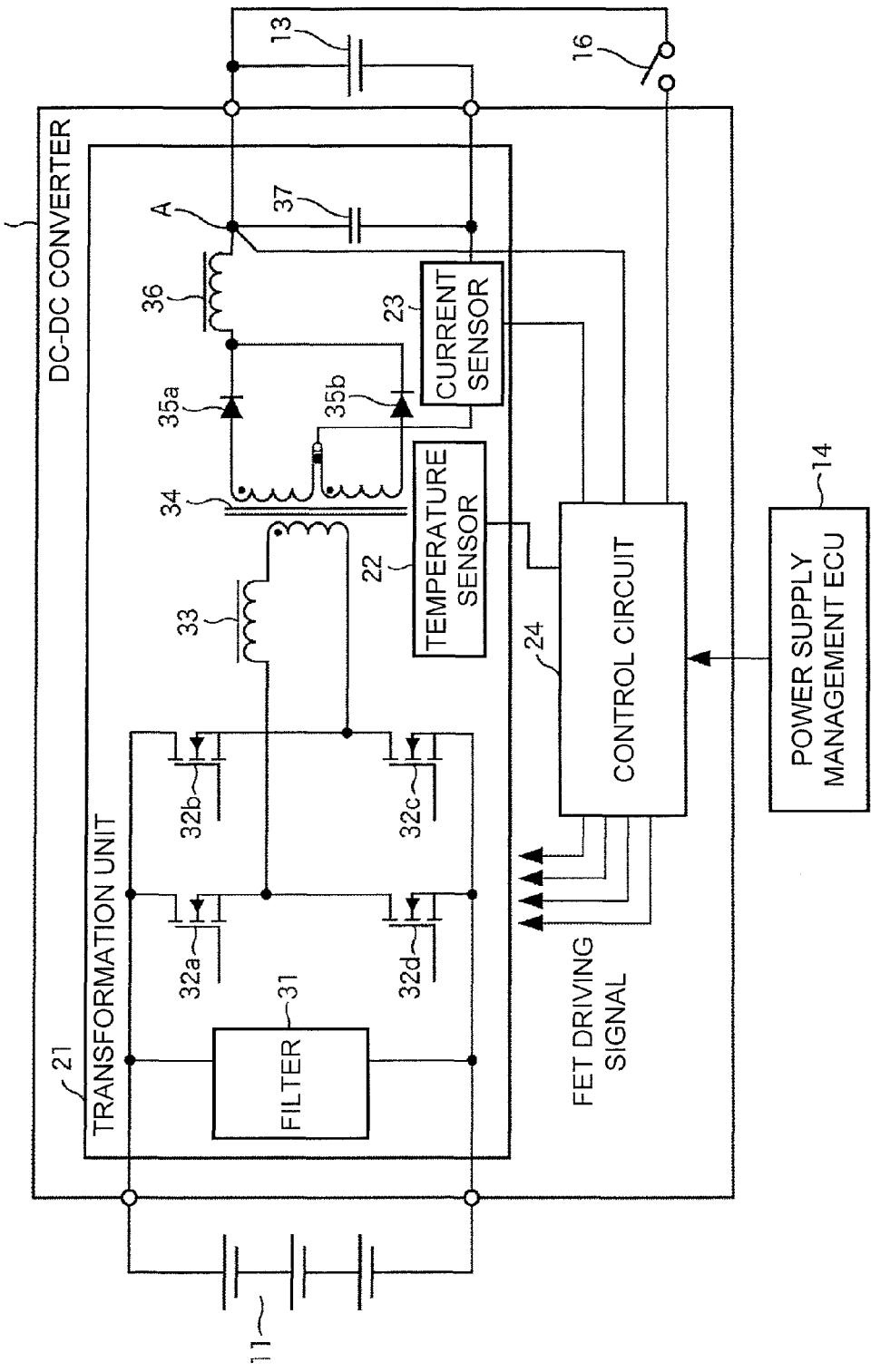
FIG. 2 is a circuit diagram illustrating a DC-DC converter according to the first embodiment of the present invention.

FIG. 2 is a circuit diagram illustrating a configuration example of the DC-DC converter 12. The power-supply management ECU 14 and the low-voltage load 15, which are connected onto the output side of the DC-DC converter 12, are not illustrated in FIG. 2.

The DC-DC converter 12 includes a transformation unit 21, a temperature sensor 22, a current sensor 23 and a control circuit 24.

The transformation unit 21 is a so-called full-bridge DC voltage conversion circuit, and the transformation unit 21 includes a filter 31, FETs 32a to 32d, a resonance coil 33, a transformer 34, diodes 35a and 35b, a coil 36 and a capacitor 37.

AC conversion of the power supplied from the high-voltage battery 11 is performed by an inverter including bridge-connected FETs 32a to 32d. The filter 31 has a function of removing a high-frequency noise generated by switching control of the inverter such that the noise does not leak out to the outside from the input side of the DC-DC converter 12.

The voltage conversion of the power to which the AC conversion is already performed by the inverter is performed by the transformer 34, and the DC conversion of the power is performed by a rectifying circuit including the transformer 34 and the diodes 35a and 35b. A harmonic component of the power is removed by an LC filter including the coil 36 and the capacitor 37, thereby outputting the DC power whose voltage is transformed.

Hereinafter, the FETs 32a to 32d are simply referred to as an FET 32 when the FETs need not be distinguished from one another.

For example, the temperature sensor 22 includes a thermistor or a thermocouple, and the temperature sensor 22 is provided in order to detect a temperature of the transformation unit 21. More specifically, the temperature sensor 22 is provided near the FET 32 or in a radiator for the FET 32 in order to prevent overheat of the FET 32. The temperature sensor 22 supplies a signal indicating the detected temperature to the control circuit 24.

For example, the current sensor 23 includes a current transformer or a current sensor in which a Hall effect is utilized. The current sensor 23 is provided in an output unit of the transformation unit 21 in order to detect overcurrent of the transformation unit 21. The current sensor 23 detects an output current of the transformation unit 21 and supplies a signal indicating the detected current value to the control circuit 24.

The control circuit 24 detects the output voltage at a point A of the transformation unit 21. The control circuit 24 supplies a driving signal to each FET 32 to perform PWM (Pulse Width Modulation) control of the inverter including the FET 32 such that the output voltage is brought close to a target voltage.

[Configuration Example of Control Circuit 24]

Figure 3:
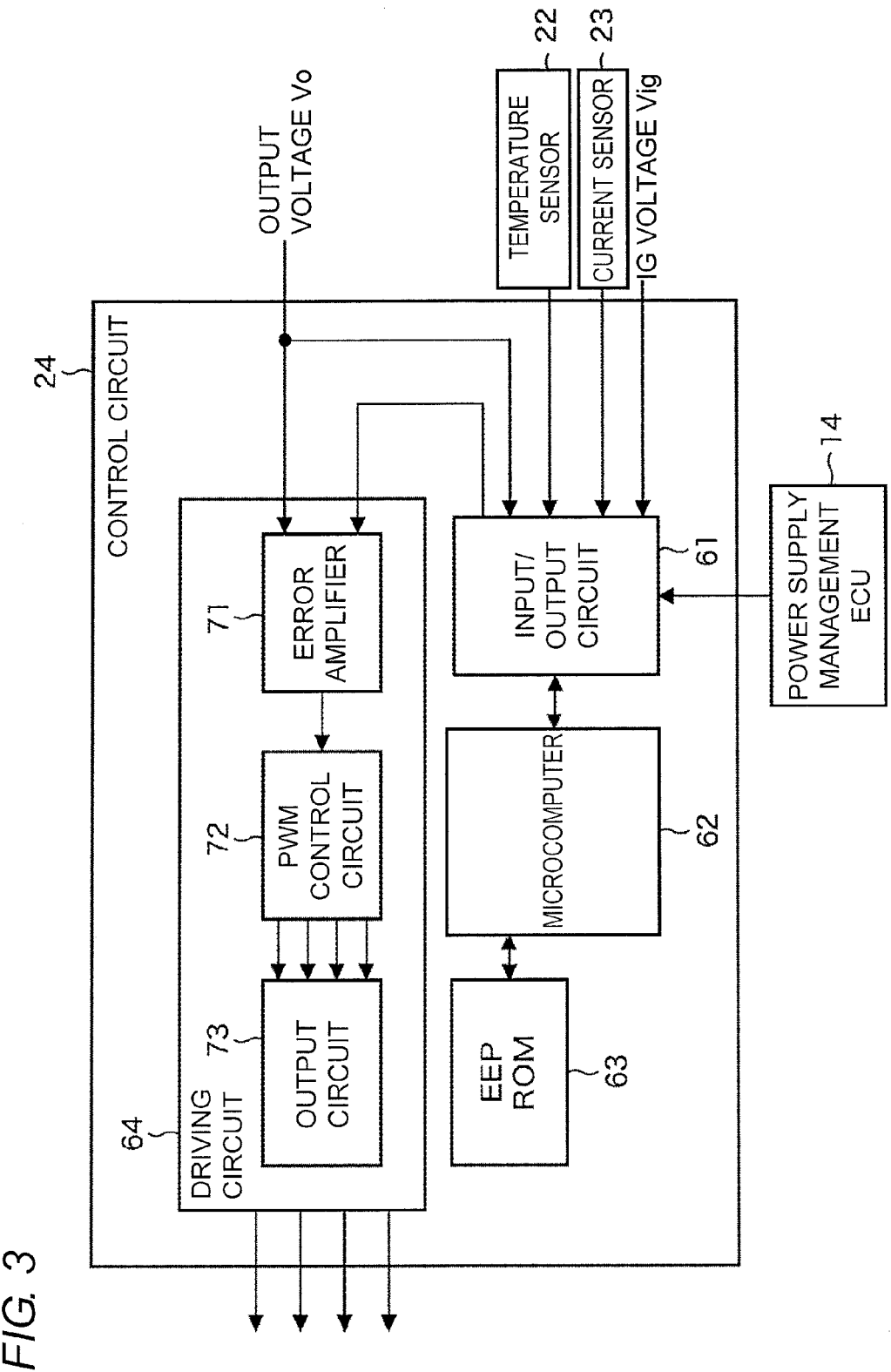
FIG. 3 is a block diagram illustrating a configuration example of a control circuit of the DC-DC converter according to one or more embodiments of the present invention.

FIG. 3 is a block diagram illustrating a configuration example of the control circuit 24. The control circuit 24 includes an input/output circuit 61, a microcomputer 62, an EEPROM 63 and a driving circuit 64. The driving circuit 64 includes an error amplifier 71, a PWM control circuit 72 and an output circuit 73.

The input/output circuit 61 obtains the signal indicating the temperature of the transformation unit 21 from the temperature sensor 22 and outputs the signal to the microcomputer 62. The input/output circuit 61 obtains the signal indicating an output current Io of the transformation unit 21 from the current sensor 23 and outputs the signal to the microcomputer 62. The input/output circuit 61 outputs a voltage (hereinafter referred to as an IG voltage Vig) inputted from the low-voltage battery 13 through the ignition switch 16 and an output voltage Vo inputted from the point A of the transformation unit 21, to the microcomputer 62.

The input/output circuit 61 obtains the signal indicating whether the high-voltage battery 11 is being charged and the signal indicating whether the low-voltage load 15 has the low load amount from the power-supply management ECU 14 and outputs the signals to the microcomputer 62. The input/output circuit 61 obtains a command value (hereinafter referred to as a voltage command value) of the output voltage of the transformation unit 21 from the microcomputer 62 and outputs the voltage command value to the error amplifier 71.

The microcomputer 62 calculates a wiring resistance R based on the output voltage Vo, the output current Io and the IG voltage Vig, and records the wiring resistance R in the EEPROM 63. The microcomputer 62 calculates the voltage command value for the transformation unit 21 and outputs the voltage command value to the input/output circuit 61.

The error amplifier 71 calculates an error between the voltage command value and the output voltage Vo inputted from the point A of the transformation unit 21, and outputs a signal indicating the calculated error to the PWM control circuit 72.

The PWM control circuit 72 sets a duty ratio of the driving signal of each FET 32 so as to correct the error of the output voltage Vo to the voltage command value, and outputs the duty ratio to the output circuit 73. The output circuit 73 supplies the driving signal having the duty ratio set by the PWM control circuit 72 to each FET 32 to perform the PWM control of the inverter including the FET 32, thereby controlling the output voltage Vo of the transformation unit 21.

[Configuration Example of Function of Microcomputer 62]

Figure 4:
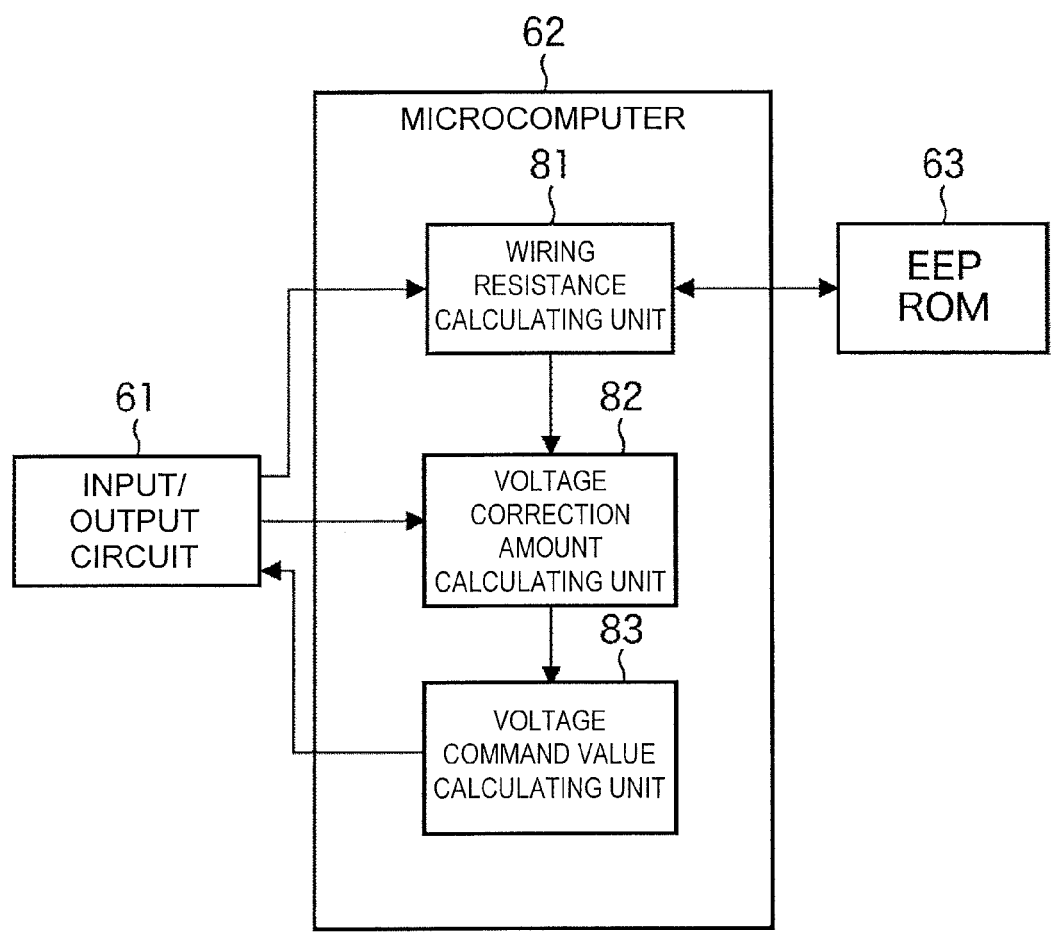
FIG. 4 is a block diagram illustrating a configuration example of a function of a microcomputer according to one or more embodiments of the present invention.

FIG. 4 is a block diagram illustrating a configuration example of a function of the microcomputer 62. The microcomputer 62 includes a wiring resistance calculating unit 81, a voltage correction amount calculating unit 82 and a voltage command value calculating unit 83.

The wiring resistance calculating unit 81 detects the output voltage Vo inputted from the point A of the transformation unit 21 through the input/output circuit 61, detects the output current Io based on the signal supplied from the current sensor 23 through the input/output circuit 61, and detects the IG voltage Vig inputted from the low-voltage battery 13 through the ignition switch 16 and the input/output circuit 61. The wiring resistance calculating unit 81 obtains the signal supplied from the power-supply management ECU 14 through the input/output circuit 61. The wiring resistance calculating unit 81 calculates the wiring resistance R based on the output voltage Vo, the output current Io and the IG voltage Vig, and records the wiring resistance R in the EEPROM 63. The wiring resistance calculating unit 81 reads the wiring resistance R from the EEPROM 63, and outputs the wiring resistance R to the voltage correction amount calculating unit 82.

The voltage correction amount calculating unit 82 detects the output current Io based on the signal supplied from the current sensor 23 through the input/output circuit 61. The voltage correction amount calculating unit 82 calculates a voltage correction amount Vpls based on the wiring resistance R and the output current Io, and outputs the voltage correction amount Vpls to the voltage command value calculating unit 83.

The voltage command value calculating unit 83 calculates a voltage command value Vadj for the transformation unit 21, and outputs the voltage command value Vadj to the error amplifier 71 through the input/output circuit 61.

[Voltage Command Processing]

Next, voltage command processing performed by the control circuit 24 will be described with reference to a flowchart of FIG. 5. For example, the voltage command processing is started when the ignition switch 16 is connected to activate the electric system of the electric-powered vehicle, and is ended when the ignition switch 16 is disconnected to stop the electric system of the electric-powered vehicle.

In step S1, the wiring resistance calculating unit 81 determines whether the wiring resistance R is already detected. When the wiring resistance R is already detected, the flow goes to step S2.

In step S2, the wiring resistance calculating unit 81 determines whether the voltage at the low-voltage battery 13 falls within a target range. Specifically, the wiring resistance calculating unit 81 detects the IG voltage Vig inputted from the low-voltage battery 13 through the ignition switch 16 and the input/output circuit 61, and compares the detected IG voltage Vig and the predetermined target range of the voltage at the low-voltage battery 13. When the IG voltage Vig is out of the target range of the voltage at the low-voltage battery 13, the determination that the voltage ($\approx$IG voltage Vig) at the low-voltage battery 13 is out of the target range is made, and the flow goes to step S3. For example, when the IG voltage Vig is out of the range of 14 V$\pm$1 V while the low-voltage battery 13 has a charge voltage of 14 V, the determination is made that the voltage at the low-voltage battery 13 is out of the target range.

On the other hand, when determined in step S1 that the wiring resistance R is not yet detected, the processing in step S2 is skipped and the flow goes to step S3.

In step S3, based on the signal supplied from the power-supply management ECU 14 through the input/output circuit 61, the wiring resistance calculating unit 81 determines whether the high-voltage battery 11 is being charged or whether the low-voltage load 15 has the low load amount. When the high-voltage battery 11 is being charged or when the low-voltage load 15 has the low load amount, the flow goes to step S4.

When the high-voltage battery 11 is being charged, the electric-powered vehicle is stopped and the low-voltage load 15 is hardly operated. Accordingly, it can be assumed that the low-voltage load 15 has the low load amount.

In step S4, the wiring resistance calculating unit 81 detects the output voltage Vo, the output current Io and the IG voltage Vig. That is, the wiring resistance calculating unit 81 detects the output voltage Vo inputted from the point A of the transformation unit 21 through the input/output circuit 61, detects the output current Io based on the signal supplied from the current sensor 23 through the input/output circuit 61, and detects the IG voltage Vig inputted from the low-voltage battery 13 through the ignition switch 16 and the input/output circuit 61.

In step S5, the wiring resistance calculating unit 81 calculates the wiring resistance R using the following equation (1).

$$R=(Vo-Vig)/Io \tag{1}$$

Then the flow goes to step S7.

Thus, in the case where the wiring resistance R is not yet detected, when the high-voltage battery 11 is being charged or when the low-voltage load 15 has the low load amount, the wiring resistance R is calculated based on the IG voltage Vig at which the ignition switch 16 is connected to start up the DC-DC converter 12. On the other hand, when the high-voltage battery 11 is not being charged and the low-voltage load 15 has the high load amount, the wiring resistance R is detected after the charge of the high-voltage battery 11 is started or after the load amount of the low-voltage load 15 becomes low.

Accordingly, because the wiring resistance R is detected when the low-voltage load 15 has the low load amount and when most of the output current Io of the DC-DC converter 12 is used as a charging current of the low-voltage battery 13, detection accuracy of the wiring resistance R is improved.

Even if the wiring resistance R is already detected, the wiring resistance R is corrected (recalculated) when the voltage at the low-voltage battery 13 is out of the target range.

On the other hand, in step S2, when the high-voltage battery 11 is not being charged and the low-voltage load 15 has the high load amount, the flow goes to step S6.

In step S6, the wiring resistance calculating unit 81 sets the wiring resistance R to an initial value. That is, when the low-voltage load 15 has the high load amount and a large load current is included in the output current Io of the DC-DC converter 12, because the detection accuracy of the wiring resistance R is degraded, the wiring resistance R is set to not the actual detected value but the initial value. The initial value is a previously set fixed value. Then the flow goes to step S7.

In step S7, the wiring resistance calculating unit 81 writes the wiring resistance R in the EEPROM 63. That is, the wiring resistance R calculated in step S5 or the initial value of the wiring resistance R set in step S6 is written in a predetermined area of the EEPROM 63. Then the flow goes to step S8.

On the other hand, when the determination is made in step S1 that the wiring resistance R is already detected, and when the determination is made in step S2 that the voltage at the low-voltage battery 13 falls within the target range, the pieces of processing in steps S3 to S7 are skipped and the flow goes to step S8.

In step S8, the wiring resistance calculating unit 81 reads the wiring resistance R from the predetermined area of the EEPROM 63. The wiring resistance calculating unit 81 outputs the read wiring resistance R to the voltage correction amount calculating unit 82. After the wiring resistance R is read once from the EEPROM 63, the voltage correction amount calculating unit 82 retains the value of the wiring resistance R until the value of the wiring resistance R is changed, and the read of the wiring resistance R from the EEPROM 63 may be eliminated.

In step S9, the voltage correction amount calculating unit 82 calculates the voltage correction amount Vpls. Specifically, the voltage correction amount calculating unit 82 detects the output current Io based on the signal supplied from the current sensor 23 through the input/output circuit 61, and calculates the voltage correction amount Vpls using the following equation (2).

$$Vpls=R \times Io \tag{2}$$

That is, the voltage correction amount Vpls is equal to an amount of voltage drop generated by the wiring resistance R and the output current Io. The voltage correction amount calculating unit 82 outputs the calculated voltage correction amount Vpls to the voltage command value calculating unit 83.

In step S10, the voltage command value calculating unit 83 calculates the voltage command value. Specifically, the voltage command value calculating unit 83 calculates a command value Vadj0 of the output voltage of the transformation unit 21 in the DC-DC converter 12. The command value Vadj0 of the output voltage of the transformation unit 21 is necessary for charging the low-voltage battery 13 and for driving the power-supply management ECU 14 and the low-voltage load 15. Then the voltage command value calculating unit 83 corrects the voltage command value using the following equation (3).

$$Vadj=Vadj0+Vpls \quad (3)$$

That is, the voltage command value calculating unit 83 corrects the voltage command value Vadj by adding the voltage correction amount Vpls to the voltage command value Vadj0.

In step S11, the voltage command value calculating unit 83 outputs the calculated voltage command value Vadj to the error amplifier 71 through the input/output circuit 61. Therefore, the driving signal supplied from the driving circuit 64 to the FET 32 is controlled such that the output voltage Vo of the DC-DC converter 12 becomes the voltage command value Vadj.

Then the flow returns to step S1 to perform the pieces of processing from step S1.

As described above, the error of the detected value of the wiring resistance R can be decreased while the wiring resistance R is always maintained at a proper value. Accordingly, the voltage drop of the output voltage Vo of the DC-DC converter 12, caused by the wiring resistance R, can properly be compensated while the difference in wiring resistance R between the devices and a temporal change of the wiring resistance R is flexibly coped with. As a result, the voltage can stably be supplied to the low-voltage battery 13. Moreover, it is not necessary to provide dedicated wiring and component, which allows the necessary cost to be suppressed.

<2. Second Embodiment>

A second embodiment of the present invention will be described below with reference to FIGS. 6 to 10.

[Configuration Example of In-Vehicle System 101]

Figure 6:
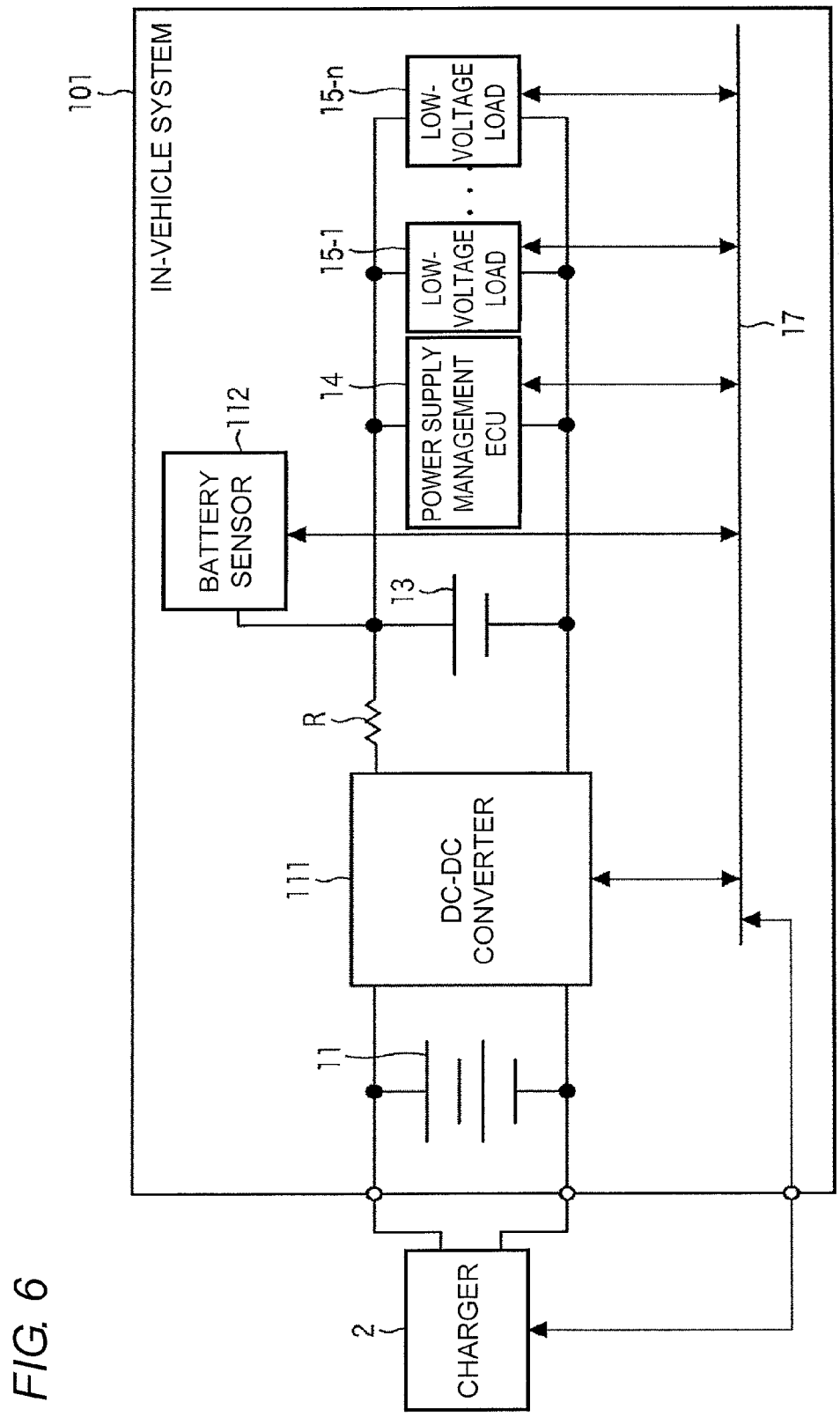
FIG. 6 is a block diagram illustrating an in-vehicle system according to a second embodiment of the present invention.

FIG. 6 is a block diagram illustrating an in-vehicle system of the second embodiment of the present invention. In FIG. 6, the component corresponding to that of FIG. 1 is denoted by the same reference numeral, and the description thereof will not be repeated.

An in-vehicle system 101 differs from the in-vehicle system 1 of FIG. 1 in that a DC-DC converter 111 is provided instead of the DC-DC converter 12 and that a battery sensor 112 is added. The ignition switch 16 of FIG. 1 is not illustrated in FIG. 6. The power-supply management ECU 14, the low-voltage loads 15-1 to 15-n, the DC-DC converter 111 and the battery sensor 112 are connected to one another through the in-vehicle LAN 17, and transmit and receive various pieces of data by CAN communication.

The DC-DC converter 111 transforms the voltage of the DC power supplied from the high-voltage battery 11, and supplies the DC power whose voltage is transformed to the low-voltage battery 13 to charge the low-voltage battery 13. The DC-DC converter 111 also supplies the DC power whose voltage is transformed to the power-supply management ECU 14 and the low-voltage loads 15-1 to 15-n. The DC-DC converter 111 obtains data indicating whether the high-voltage battery 11 is being charged and data indicating the load amount of the low-voltage load 15 from the power-supply management ECU 14 through the in-vehicle LAN 17. The DC-DC converter 111 obtains data indicating the voltage at the low-voltage battery 13 from the battery sensor 112 through the in-vehicle LAN 17.

The battery sensor 112 detects the voltage, input current and output current of the low-voltage battery 13, and supplies pieces of data indicating the detection results to each unit through the in-vehicle LAN 17.

[Configuration Example of DC-DC Converter 111]

Figure 7:
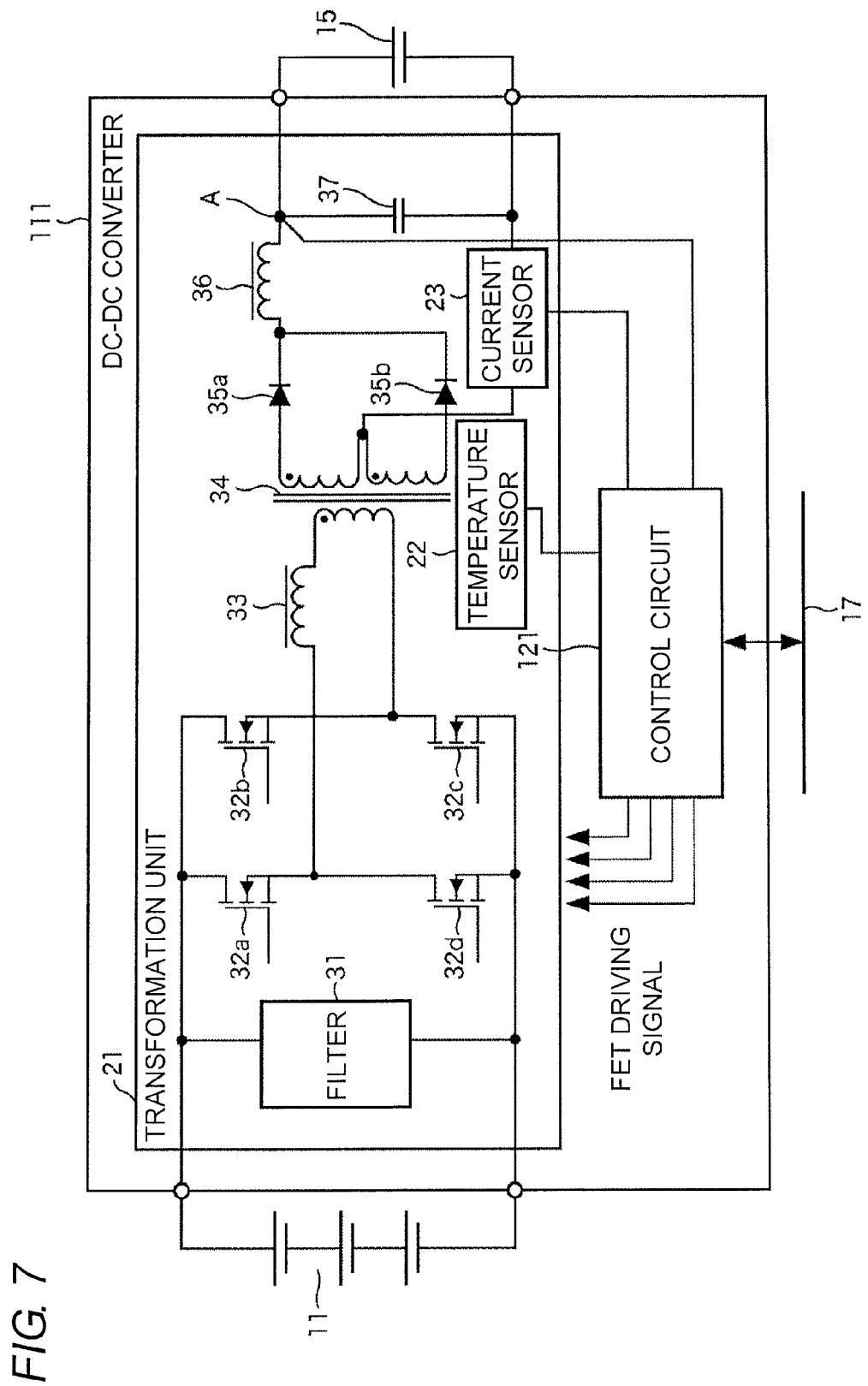
FIG. 7 is a circuit diagram illustrating a DC-DC converter according to the second embodiment of the present invention.

FIG. 7 is a circuit diagram illustrating a configuration example of the DC-DC converter 111. In FIG. 7, the component corresponding to that of FIG. 2 is denoted by the same reference numeral, and the description thereof will not be repeated.

The DC-DC converter 111 differs from the DC-DC converter 12 of FIG. 2 only in that a control circuit 121 is provided instead of the control circuit 24.

The control circuit 121 obtains the signal indicating the temperature of the transformation unit 21 from the temperature sensor 22. The control circuit 121 obtains the signal indicating the output current of the transformation unit 21 from the current sensor 23. The control circuit 121 obtains the data indicating whether the high-voltage battery 11 is being charged and the data indicating the load amount of the low-voltage load 15 from the power-supply management ECU 14 through the in-vehicle LAN 17. The control circuit 121 obtains the data indicating the voltage at the low-voltage battery 13 from the battery sensor 112 through the in-vehicle LAN 17. The control circuit 121 detects the output voltage at the point A of the transformation unit 21, and supplies the driving signal of each FET 32 such that the output voltage is brought close to the target voltage, thereby performing the PWM control of the inverter including the FET 32.

[Configuration Example of Control Circuit 121]

Figure 8:
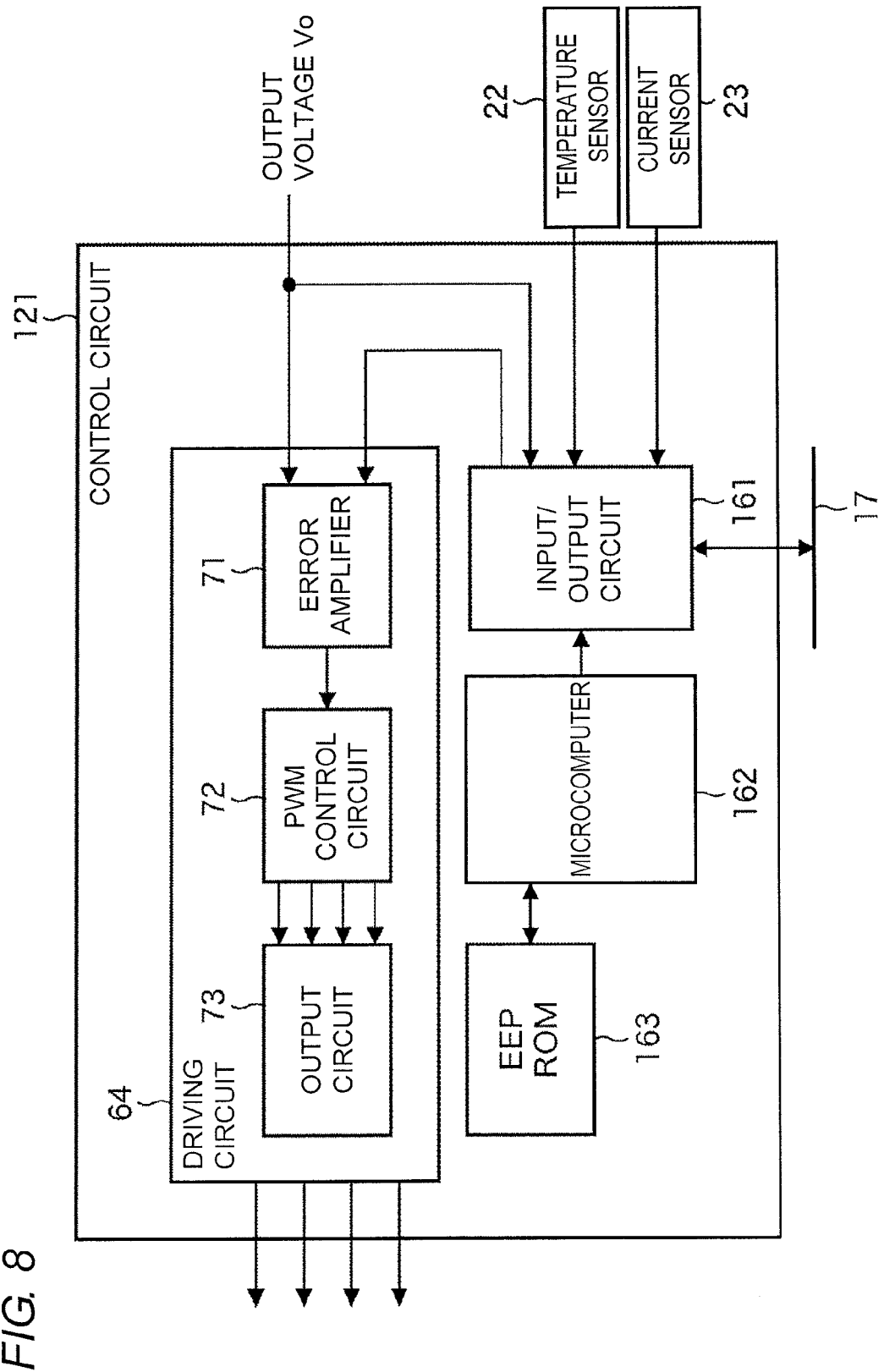
FIG. 8 is a block diagram illustrating a configuration example of a control circuit of the DC-DC converter according to one or more embodiments of the present invention.

FIG. 8 is a block diagram illustrating a configuration example of the control circuit 121. In FIG. 8, the component corresponding to that of FIG. 3 is denoted by the same reference numeral, and the description thereof will not be repeated.

The control circuit 121 differs from the control circuit 24 of FIG. 3 only in that an input/output circuit 161, a microcomputer 162 and an EEPROM 163 are provided instead of the input/output circuit 61, the microcomputer 62 and the EEPROM 63.

The input/output circuit 161 obtains the signal indicating the temperature of the transformation unit 21 from the temperature sensor 22, and outputs the signal to the microcomputer 162. The input/output circuit 161 obtains the signal indicating the output current Io of the transformation unit 21 from the current sensor 23, and outputs the signal to the microcomputer 162. The input/output circuit 161 outputs the output voltage V0, inputted from the point A of the transformation unit 21, to the microcomputer 162. The input/output circuit 161 obtains the data indicating whether the high-voltage battery 11 is being charged and the data indicating the load amount of the low-voltage load 15 from the power-supply management ECU 14 through the in-vehicle LAN 17, and outputs the pieces of data to the microcomputer 162. The input/output circuit 161 obtains the data indicating the voltage at the low-voltage battery 13 from the battery sensor 112 through the in-vehicle LAN 17, and outputs the data to the microcomputer 162. The input/output circuit 161 obtains the voltage command value of the transformation unit 21 from the microcomputer 162, and supplies the voltage command value to the error amplifier 71.

The microcomputer 162 calculates the wiring resistance R based on the output voltage V0, the output current Io and the IG voltage Vig, and records the wiring resistance R in the EEPROM 163. Alternatively, based on a correspondence table (hereinafter, referred to as a wiring resistance correspondence table) between a destination vehicle identification code recorded in the EEPROM 162 and the wiring resistance R, the microcomputer 162 determines the wiring resistance R of the electric-powered vehicle in which the in-vehicle system 101 and records the wiring resistance R in the EEPROM 163. The microcomputer 162 calculates the voltage command value for the transformation unit 21 and outputs the voltage command value to the input/output circuit 161.

The destination vehicle identification code is a code used for identifying a vehicle type of the electric-powered vehicle, and a different destination vehicle identification code is provided to each vehicle type. The destination vehicle identification code corresponding to the vehicle type of the electric-powered vehicle in which the in-vehicle system 101 is provided is previously recorded in the EEPROM 163.

The wiring resistance correspondence table is a list in which the destination vehicle identification code is correlated with the wiring resistance R of the vehicle type corresponding to each code. For example, a value determined by actual measurement or calculation is previously set to the wiring resistance R of each vehicle type in the wiring resistance correspondence table.

[Configuration Example of Function of Microcomputer 162]

Figure 9:
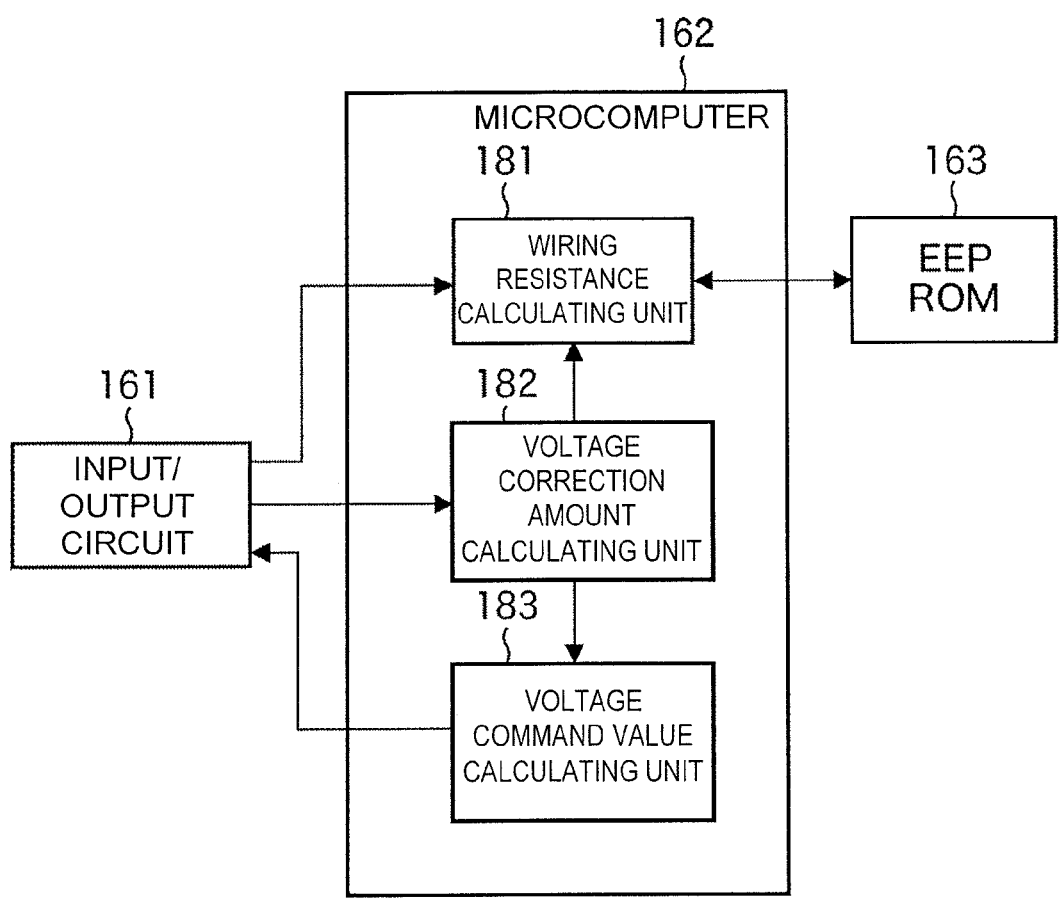
FIG. 9 is a block diagram illustrating a configuration example of a function of a microcomputer according to one or more embodiments of the present invention.

FIG. 9 is a block diagram illustrating a configuration example of a function of the microcomputer 162. The microcomputer 162 includes a wiring resistance calculating unit 181, a voltage correction amount calculating unit 182 and a voltage command value calculating unit 183.

The wiring resistance calculating unit 181 detects the output voltage V0 inputted from the point A of the transformation unit 21 through the input/output circuit 161 and detects the output current Io based on the signal supplied from the current sensor 23 through the input/output circuit 161. The wiring resistance calculating unit 181 obtains the data indicating whether the high-voltage battery 11 is being charged and the data indicating the load amount of the low-voltage load 15 from the power-supply management ECU 14 through the in-vehicle LAN 17 and the input/output circuit 161. The wiring resistance calculating unit 181 obtains the data indicating the voltage at the low-voltage battery 13 from the battery sensor 112 through the in-vehicle LAN 17 and the input/output circuit 161.

The wiring resistance calculating unit 181 calculates the wiring resistance R based on the output voltage V0, the output current Io and the IG voltage Vig, and records the wiring resistance R in the EEPROM 163. Alternatively, the wiring resistance calculating unit 181 determines the wiring resistance R of the electric-powered vehicle in which the in-vehicle system 101 is provided based on the wiring resistance correspondence table recorded in the EEPROM 162, and records the wiring resistance R in the EEPROM 163. The wiring resistance calculating unit 181 reads the wiring resistance R from the EEPROM 163 and outputs the wiring resistance R to the voltage correction amount calculating unit 182.

The voltage correction amount calculating unit 182 detects the output current Io based on the signal supplied from the current sensor 23 through the input/output circuit 161. The voltage correction amount calculating unit 182 calculates the voltage correction amount Vpls based on the wiring resistance R and the output current Io, and outputs the voltage correction amount Vpls to the voltage command value calculating unit 183.

The voltage command value calculating unit 183 calculates the voltage command value Vadj for the transformation unit 21 and outputs the voltage command value Vadj to the error amplifier 71 through the input/output circuit 161.

[Output Control Processing]

Figure 10:
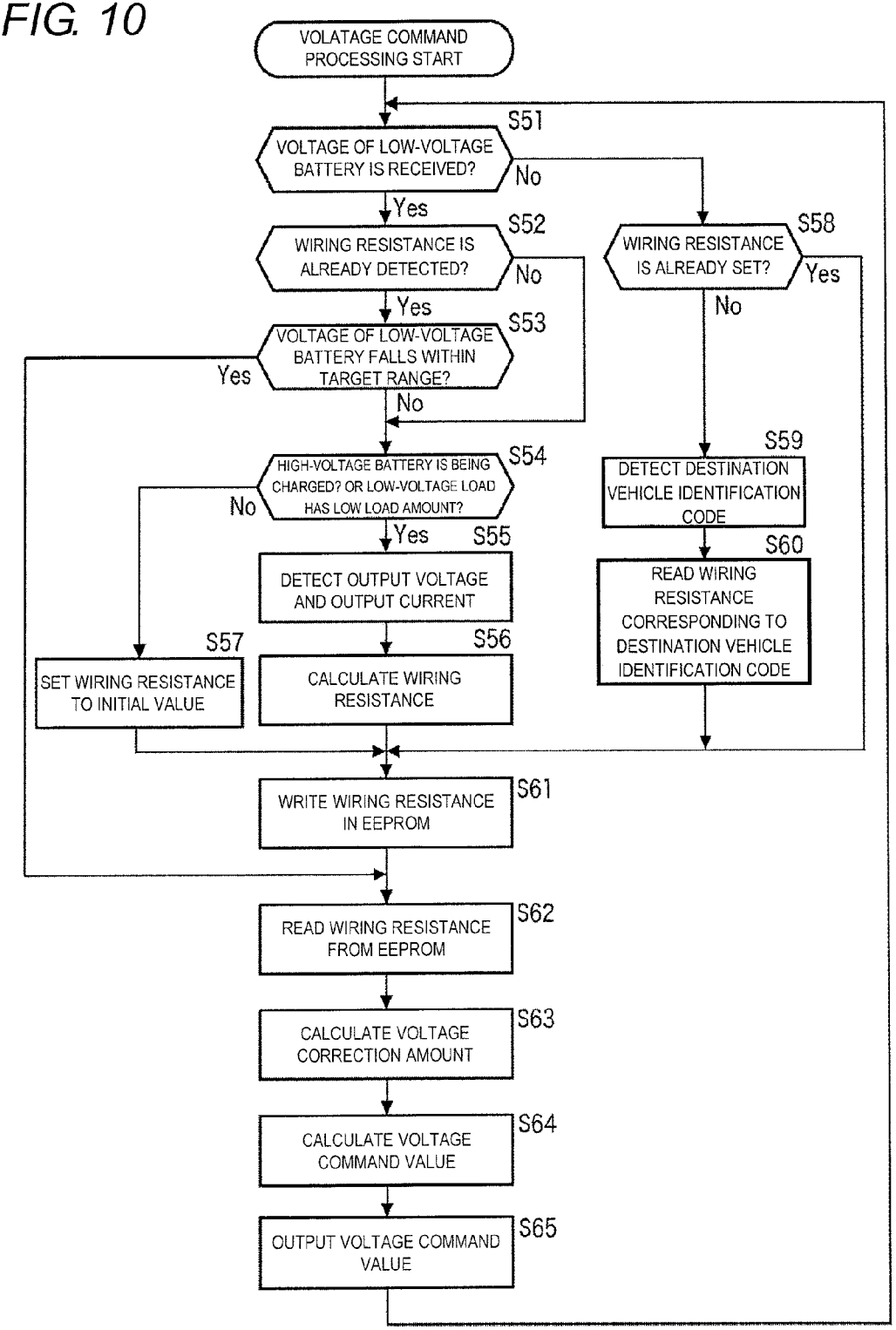
FIG. 10 is a flowchart illustrating voltage command processing performed by the control circuit according to one or more embodiments of the present invention.

Next, voltage command processing performed by the control circuit 121 will be described with reference to a flowchart of FIG. 10. For example, the voltage command processing is started when the ignition switch (not illustrated) is connected to activate the electric system of the electric-powered vehicle, and is ended when the ignition switch is disconnected to stop the electric system of the electric-powered vehicle.

In step S51, the wiring resistance calculating unit 181 determines whether the voltage at the low-voltage battery 13 can be received. Specifically, when the battery sensor 112 is connected to the input/output circuit 161 through the in-vehicle LAN 17, the wiring resistance calculating unit 181 conducts communication with the battery sensor 112 through the input/output circuit 161 and the in-vehicle LAN 17 to try to receive the voltage at the low-voltage battery 13. When the wiring resistance calculating unit 181 determines that the voltage at the low-voltage battery 13 can be received, the flow goes to step S52.

In step S52, the wiring resistance calculating unit 181 determines whether the wiring resistance R is already detected. When the wiring resistance R is already detected, the flow goes to step S53.

Figure 5:
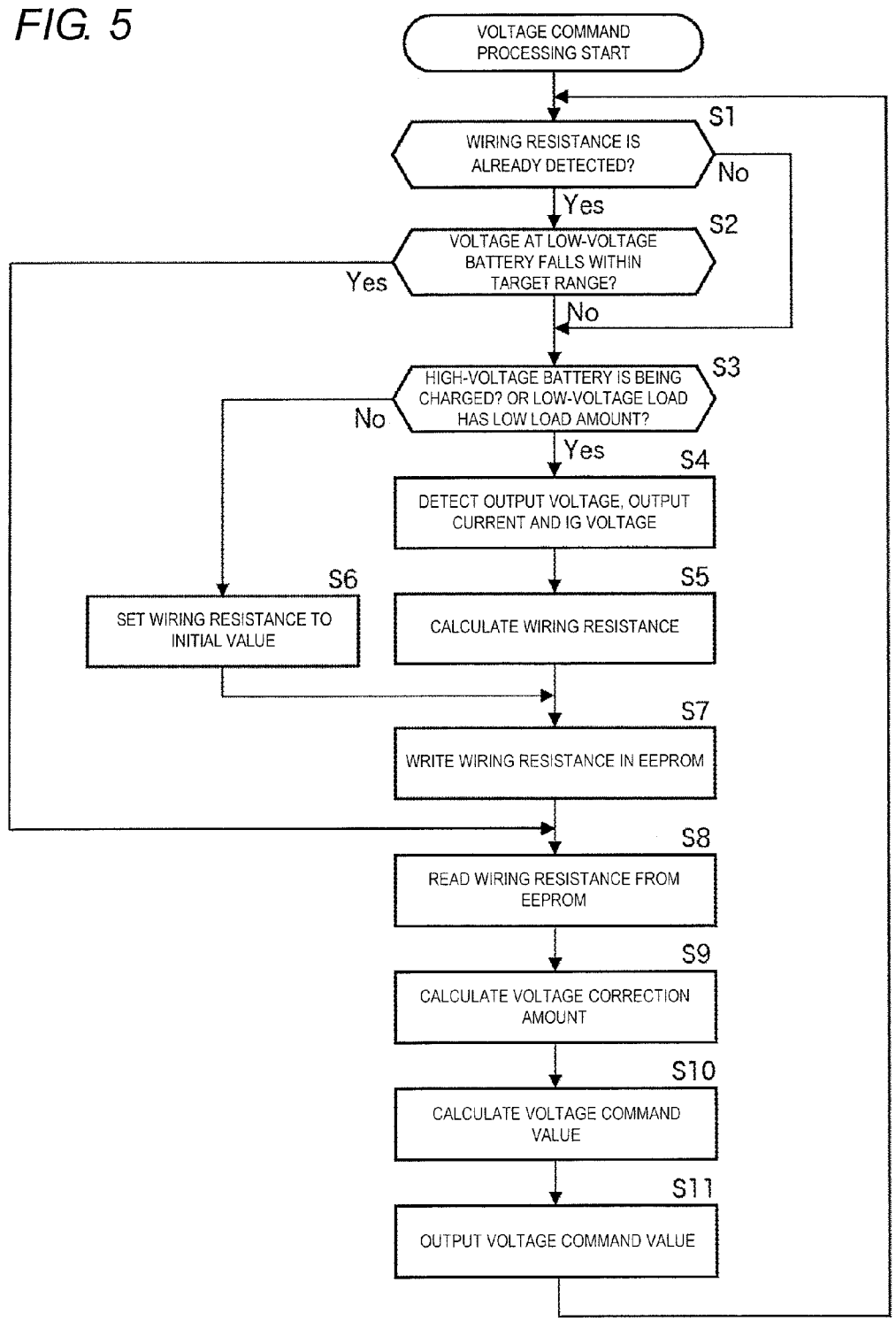
FIG. 5 is a flowchart illustrating voltage command processing performed by the control circuit according to one or more embodiments of the present invention.

In step S53, the wiring resistance calculating unit 181 determines whether the voltage at the low-voltage battery 13 falls within the target range through processing similar to that in step S2 of FIG. 5. When the voltage at the low-voltage battery 13 is out of the target range, the flow goes to step S54.

On the other hand, when the determination is made in step S52 that the wiring resistance R is not yet detected, the processing in step S53 is skipped and the flow goes to step S54.

In step S54, the wiring resistance calculating unit 181 obtains the data indicating whether the high-voltage battery 11 is being charged and the data indicating the load amount of the low-voltage load 15 from the power-supply management ECU 14 through the in-vehicle LAN 17 and the input/output circuit 161, and determines whether the high-voltage battery 11 is being charged or whether the low-voltage load 15 has the low load amount. When determined that the high-voltage battery 11 is being charged or that the low-voltage load 15 has the low load amount, the flow goes to step S55.

In step S55, the wiring resistance calculating unit 181 detects the output voltage Vo inputted from the point A of the transformation unit 21 through the input/output circuit 161, and detects the output current Io based on the signal supplied from the current sensor 23 through the input/output circuit 161. In step S56, the wiring resistance calculating unit 181 calculates the wiring resistance R using the following equation (4).

$$R=(Vo-Vb)/Io \quad (4)$$

In this case, Vb is the voltage at the low-voltage battery 13 obtained from the battery sensor 112.

Then the flow goes to step S61.

On the other hand, when the determination is made in step S54 that the high-voltage battery 11 is not being charged and that the low-voltage load 15 has the high load amount, the flow goes to step S57.

In step S57, the wiring resistance R is set to the initial value similarly to the processing in step S6 of FIG. 5. Then the flow goes to step S61.

On the other hand, in step S51, when the wiring resistance calculating unit 181 fails to receive the voltage at the low-voltage battery 13 from the battery sensor 112, or when the battery sensor 112 is not connected to the input/output circuit 161 through the in-vehicle LAN 17, the wiring resistance calculating unit 181 determines that the voltage at the low-voltage battery 13 is not received, and the flow goes to step S58.

In step S58, the wiring resistance calculating unit 181 determines whether the wiring resistance R is already set. When determined that the wiring resistance R is not yet set, the flow goes to step S59.

In step S59, the wiring resistance calculating unit 181 detects the destination vehicle identification code. That is, the wiring resistance calculating unit 181 reads the destination vehicle identification code of the electric-powered vehicle in which the in-vehicle system 101 is provided from a predetermined area of the EEPROM 163.

In step S60, the wiring resistance calculating unit 181 reads the wiring resistance R corresponding to the destination vehicle identification code. That is, the wiring resistance calculating unit 181 reads the wiring resistance R corresponding to the detected destination vehicle identification code from the wiring resistance correspondence table recorded in the EEPROM 163. Then the flow goes to step S61.

On the other hand, when determined that the wiring resistance R is already set in step S58, the pieces of processing in steps S59 and S60 are skipped and the flow goes to step S61.

In step S61, the wiring resistance calculating unit 181 writes the wiring resistance R in the EEPROM 163. That is, the wiring resistance R calculated in step S56, the initial value of the wiring resistance R set in step S57, or the wiring resistance R read from the wiring resistance correspondence table in step S60 is written in the predetermined area of the EEPROM 163. Then the flow goes to step S62.

On the other hand, when determined in step S53 that the voltage at the low-voltage battery 13 falls within the target range, the flow goes to step S62.

Because the pieces of processing in steps S62 to S65 are similar to those in steps S8 to S11 of FIG. 5, the descriptions thereof will not be given. The wiring resistance R is read from the EEPROM 163 through the pieces of processing in steps S62 to S65, the voltage command value is set based on the read wiring resistance R, and the output voltage of the transformation unit 21 is controlled based on the voltage command value.

Then, the flow returns to step S51 to perform the pieces of processing from step S51.

Thus, when the DC-DC converter 111 can conduct communication with the battery sensor 112, similarly to the first embodiment, the voltage drop of the output voltage Vo of the DC-DC converter 111, caused by the wiring resistance R, can properly be compensated while the difference in wiring resistance R between the devices and the temporal change of the wiring resistance R is flexibly coped with.

Even if the DC-DC converter 111 cannot conduct communication with the battery sensor 112, the wiring resistance R is set according to the vehicle type of the electric-powered vehicle in which the in-vehicle system 101 is provided based on the wiring resistance correspondence table, so that the voltage drop of the output voltage Vo of the DC-DC converter 111, caused by the wiring resistance R, can properly be compensated.

Moreover, it is not necessary to provide the dedicated wiring and component, which allows the necessary cost to be suppressed.

<3. Modifications>

In the above description, by way of example, the wiring resistance R is detected again when the voltage at the low-voltage battery 13 is out of the target range. For example, because the wiring resistance R varies according to the temperature, the wiring resistance R may periodically be detected.

The determination as to whether the high-voltage battery 11 is being charged may be made based on a 50-Hz or 60-Hz ripple waveform that emerges on the input voltage of the DC-DC converter when the high-voltage battery 11 is being charged by the power from a household outlet.

The current sensor 23 may be provided in the input unit of the transformation unit 21 to detect the input current.

A shunt resistance may be provided instead of the current sensor 23, and the current may indirectly be determined by measuring the voltage at both ends of the shunt resistance.

In the second embodiment, instead of the battery sensor 112, the power-supply management ECU 14 may detect the voltage at the low-voltage battery 13.

One or more embodiments of the present invention can be applied to a DC-DC converter that is provided in an apparatus except the electric-powered vehicle to supply the charging voltage to the battery.

The first embodiment and the second embodiment may be combined. When a difference between the wiring resistance R detected using the IG voltage Vig and the wiring resistance R detected using a voltage Vb at the low-voltage battery 13 detected by the battery sensor 112 falls within a predetermined threshold, a determination is made that the wiring resistance R is normal, and the wiring resistance R is recorded. When the difference between the wiring resistances R exceeds a threshold, a determination is made that the detected wiring resistance R is abnormal, and the wiring resistance R is not recorded.

The sequence of pieces of processing can be performed by either hardware or software. When the sequence of pieces of processing is performed by the software, a program constituting the software is installed in a computer. Examples of the computer include a computer incorporated in dedicated hardware and a general-purpose personal computer that can perform various functions by installing various programs.

Figure 11:
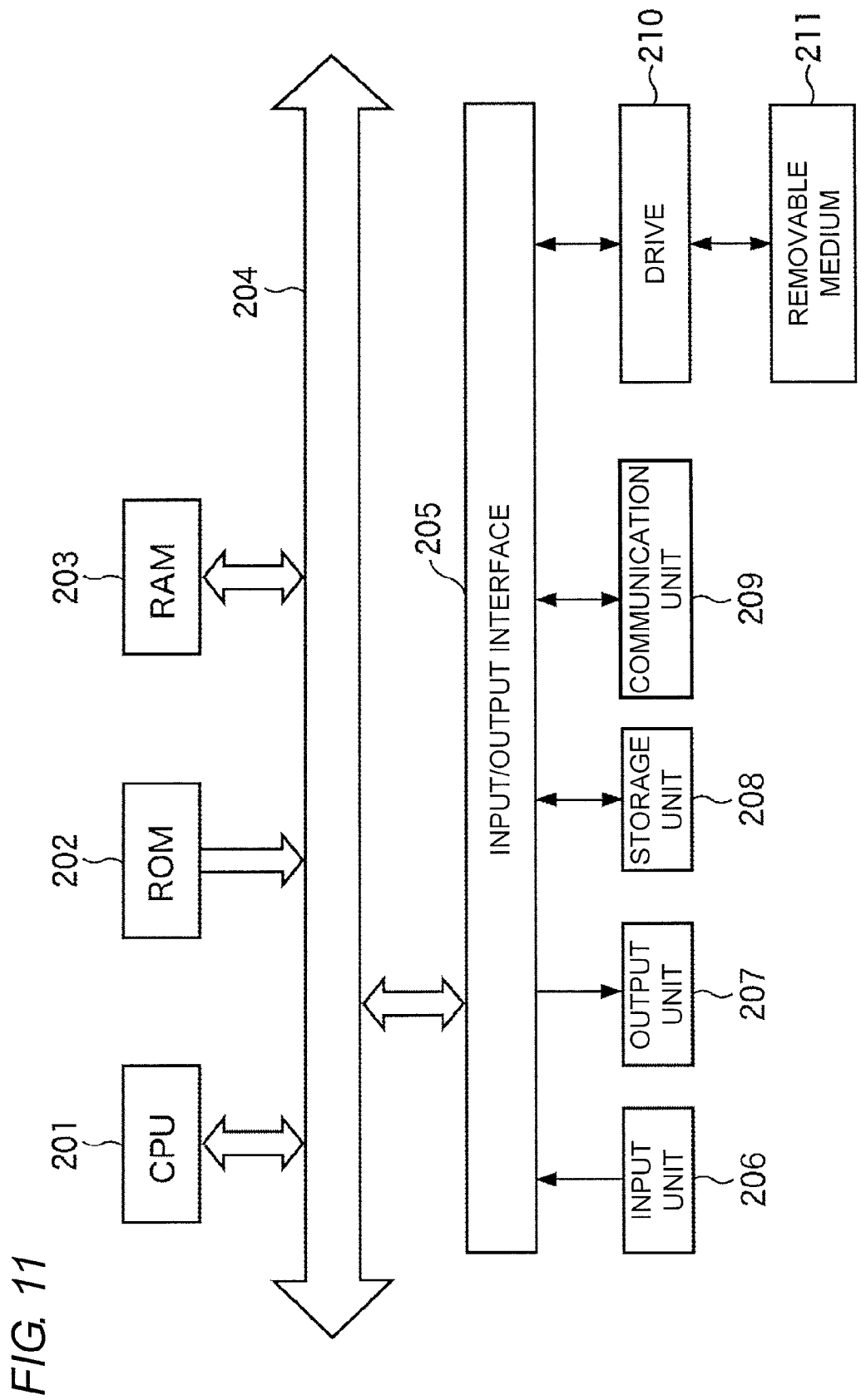
FIG. 11 is a block diagram illustrating a configuration example of a computer according to one or more embodiments of the present invention.

FIG. 11 is a block diagram illustrating a configuration example of hardware of a computer that performs the sequence of pieces of processing using a program.

In the computer, a CPU (Central Processing Unit) 201, a ROM (Read Only Memory) 202 and a RAM (Random Access Memory) 203 are connected to one another through a bus 204.

Further, an input/output interface 205 is connected to the bus 204. An input unit 206, an output unit 207, a storage unit 208, a communication unit 209 and a drive 210 are connected to the input/output interface 205.

For example, the input unit 206 includes a keyboard, a mouse and a microphone. For example, the output unit 207 includes a display and a speaker. For example, the storage unit 208 includes a hard disk and a nonvolatile memory. For example, the communication unit 209 includes a network interface. The drive 210 drives a removable medium 211 such as a magnetic disk, an optical disk, a magneto-optical disk and a semiconductor memory.

In the computer having the above-described configuration, for example, the CPU 201 loads a program stored in the storage unit 208 on the RAM 203 through the input/output interface 205 and the bus 204, thereby performing the sequence of pieces of processing.

For example, the program executed by the computer (CPU 201) can be provided while recorded in the removable medium 211 as a package medium. The program can also be provided through a wired or wireless transmission medium such as a local area network, the Internet and a digital satellite broadcast.

In the computer, the program can be installed in the storage unit 208 through the input/output interface 205 by loading the removable medium 211 on the drive 210. The program can also be received by the communication unit 209 through the wired or wireless transmission medium and installed in the storage unit 208. Alternatively, the program can previously be installed in the ROM 202 or the storage unit 208.

The program executed by the computer may be a program in which the pieces of processing are performed in time series along a procedure described above or a program in which the pieces of processing are performed in parallel or a necessary timing at which a call is performed or the like.

In the above embodiments, the system is the whole apparatus including the plurality of devices.

The present invention is not limited to the above embodiments, but various changes can be made without departing from the scope of the present invention. While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A DC-DC converter that is connected to a battery through a starting switch and started up by the starting switch, the DC-DC converter comprising:
    a transformation unit that transforms an input voltage and supplies the voltage to the battery without the starting switch;
    a wiring resistance calculating unit that calculates a wiring resistance between the transformation unit and the battery based on a voltage inputted from the battery through the starting switch in connecting the starting switch and an output voltage and an output current of the transformation unit; and
    an output voltage control unit that controls the output voltage of the transformation unit by correcting a command value of the output voltage of the transformation unit based on the calculated wiring resistance.

2. The DC-DC converter according to claim 1,
    wherein the wiring resistance calculating unit records the calculated wiring resistance,
    wherein the wiring resistance calculating unit does not calculate the wiring resistance when the wiring resistance is already recorded in connecting the starting switch, and
    wherein the output voltage control unit corrects a command value of the output voltage of the transformation unit based on the recorded wiring resistance.

3. The DC-DC converter according to claim 1,
    wherein the wiring resistance calculating unit recalculates the wiring resistance based on a voltage inputted from the battery through the starting switch and the output voltage and output current of the transformation unit,
    wherein the wiring resistance calculating unit recalculates the wiring resistance when the voltage inputted from the battery through the starting switch is out of a predetermined target range.

4. The DC-DC converter according to claim 1, wherein the wiring resistance calculating unit does not calculate the wiring resistance but sets the wiring resistance to a predetermined value when a load of the battery is not lower than a predetermined threshold in connecting the starting switch.

5. The DC-DC converter according to claim 2,
    wherein the wiring resistance calculating unit recalculates the wiring resistance based on a voltage inputted from the battery through the starting switch and the output voltage and output current of the transformation unit,
    wherein the wiring resistance calculating unit recalculates the wiring resistance when the voltage inputted from the battery through the starting switch is out of a predetermined target range.

* * * * *